(12) United States Patent
Mulvay et al.

(10) Patent No.: US 11,401,663 B2
(45) Date of Patent: Aug. 2, 2022

(54) RAIL COVER

(71) Applicant: PANDROL (VORTOK) LIMITED, Surrey (GB)

(72) Inventors: Craig Mulvay, Plymouth (GB); Adrian John Hunt, Plymouth (GB)

(73) Assignee: MULTICLIP CO. LTD., Surrey (GB)

( * ) Notice: Subject to any disclaimer, the term of this patent is extended or adjusted under 35 U.S.C. 154(b) by 406 days.

(21) Appl. No.: 16/275,990

(22) Filed: Feb. 14, 2019

(65) Prior Publication Data

US 2019/0276986 A1    Sep. 12, 2019

(30) Foreign Application Priority Data

Mar. 7, 2018    (GB) ...................................... 1803617

(51) Int. Cl.
| | | |
|---|---|---|
| *E01B 19/00* | (2006.01) | |
| *E01B 26/00* | (2006.01) | |
| *B60M 5/00* | (2006.01) | |

(52) U.S. Cl.
CPC .............. *E01B 19/00* (2013.01); *E01B 26/00* (2013.01); *B60M 5/00* (2013.01)

(58) Field of Classification Search
CPC .......... E01B 19/00; E01B 26/00; E01B 13/02; E01B 9/00–688; E01B 2204/01; B60M 5/00; B60M 1/04; B60M 1/34
USPC .... 104/140, 141; 238/1, 140, 312, 106, 310, 238/328, 14.05–14.15, 105, 315, 316, 238/343, 299
See application file for complete search history.

(56) References Cited

U.S. PATENT DOCUMENTS

| | | | | |
|---|---|---|---|---|
| 1,665,187 | A * | 4/1928 | McVicker | E01B 13/02 238/299 |
| 1,758,282 | A * | 5/1930 | Gatch | E01B 13/02 238/299 |
| 3,927,742 | A * | 12/1975 | Reynolds | B60M 1/04 191/30 |
| 4,826,078 | A * | 5/1989 | Arvin | H01R 4/26 238/14.05 |
| 2008/0257973 | A1* | 10/2008 | Reichle | E01B 26/00 238/351 |

(Continued)

FOREIGN PATENT DOCUMENTS

| | | | |
|---|---|---|---|
| DE | 9003837 U1 | 6/1990 | |
| DE | 19935562 A1 | 3/2000 | |
| DE | 202013003686 U1 * | 4/2014 | ............. B60M 5/00 |

(Continued)

OTHER PUBLICATIONS

EPO, Extended European Search Report, dated Jun. 28. 2019, re European Patent Application No. 19156374.1.

(Continued)

*Primary Examiner* — Zachary L Kuhfuss
*Assistant Examiner* — Cheng Lin
(74) *Attorney, Agent, or Firm* — Perry + Currier

(57) ABSTRACT

In accordance with an embodiment, there is disclosed a rail cover for covering an underside of a foot of a railway rail, the rail cover comprising: mutually connectable cover parts configured to respectively extend at least partially around opposing sides of the foot of the railway rail and connectable by an adjustable ratcheting connection or an interference fit to resist separation of the mutually connectable cover parts.

9 Claims, 2 Drawing Sheets

(56) References Cited

U.S. PATENT DOCUMENTS

2017/0159243 A1    6/2017    Campman
2018/0073201 A1\*   3/2018    Mulvay ................... E01B 26/00

FOREIGN PATENT DOCUMENTS

| EP | 3296461 A1 | 3/2018 |
| GB | 2554073 A | 3/2018 |
| JP | 2004215960 A | 8/2004 |
| RU | 175599 U1 | 12/2017 |
| WO | WO 201524834 A1 | 8/2015 |

OTHER PUBLICATIONS

NZIPO, First Examination Report, dated May 30, 2019, re New Zealand Patent Application No. 750651.
UKIPO, Search Report under Section 17(5), dated Aug. 17, 2018, re UK Patent Application No. GB1803617.8.

\* cited by examiner

RAIL COVER

FIELD

The field of the invention relates to a rail cover and, in particular, to an adjustable rail cover for covering an underside of a foot of a railway rail.

BACKGROUND

A common problem in the field of railway design and, in particular, railway rail cabling is how to appropriately manage or organise cables which need to be routed underneath the running rails of a train track. Existing methods of routing cables underneath running rails include clipping the cables to railway sleepers, which support the rails. This technique can be detrimental to the life of the sleepers depending on the methods used to clip the cables to the sleepers and can also take significant time for installation, which in turns raises cost and complexity. Another method for routing cables underneath railway tracks includes laying simple plastic drainpipes underneath the rails as a guide and running cables through the plastic drainpipes. It can however be impossible or very difficult to run cables with plug couplers (plug ends) through such drainpipes as they may be too large or a very tight fit. When cables are run under rails and/or next to sleepers, relative movement between the cables and the rails and/or sleepers can result in wear of the cables and in particular wear of the protective insulation part of the cable.

It is therefore desirable to provide a rail cover capable of protecting at least the cable from wear, while not damaging the sleeper or rail. It may be further preferable for the rail cover to be rapidly installable, at a low cost and requiring little or no on-site adaptation during deployment.

STATEMENTS

In an embodiment of a first aspect there is provided a rail cover for covering an underside of a foot of a railway rail. In accordance with the embodiment, the rail cover may comprise mutually connectable cover parts configured to respectively extend at least partially around opposing sides of the foot of the railway rail. The mutually connectable cover parts also being connectable by an adjustable ratcheting connection to resist separation of the mutually connectable cover parts.

In use, the rail cover may comprise two parts which, when attached together, substantially mimic or conform to the shape of the foot of the rail. The two parts may initially be completely separated, prior to attachment to a rail. Alternatively, the two parts may be positioned so that the adjustable ratcheting system is engaged, but the two parts are distanced to pass around at least part of the foot of the rail, so as to be easily connectable to the foot of the rail. This may be described as an open position. The two parts may then be moved to a closed position so that the parts extend around opposing sides of the foot of the rail sufficiently so as to hold the rail cover against the rail.

An advantage associated with the embodiments is a rapidly installable rail cover, which may be positioned between a rail and a cable, passing under the rail, so as to protect the cable from wear.

Optionally, the mutually connectable cover parts include a first cover part. The first cover part may include a first connecting portion and a first side portion. The mutually connectable cover parts may further include a second cover part. The second cover part may include a second connecting portion and a second side portion. In an example, the first and second connecting portions are configured to connect together by the adjustable ratcheting connection which is adjustable to adjust the relative positions of the first and second cover parts. The first and second side portions may be configured to extend at least partially around opposite sides of the foot of the rail so that, when the first and second connecting portions are connected and pressed together (moved from the open position to the closed position), the first and second side portions hold the adjustable rail cover against the foot of the rail.

In a preferred example, the ratcheting connection may be a rack and pawl-type mechanism. Further, preferably, the first and second cover parts may be electrically non-conductive.

The rack and pawl-type mechanism may preferably be used in order to connect the cover parts together. In an example, the rack may be made to a rigid material and the pawl may be sufficiently flexible to pass over the rack when being connected. The mechanism may be set up to allow for easy connection of the cover parts, but may inhibit separation. Providing electrically non-conductive cover parts has the advantage of an extra layer of protection for any cables running under the rail.

In a preferred example, the rail cover as described above may further comprise a first sleeper cover part. The first sleeper cover part may be configured to extend from one edge of the first cover part, in a direction perpendicular to a plane in which the first cover part extends, so that, when positioned adjacent to a rail and against a sleeper, covers at least part of the sleeper. Further, the rail cover as described above may further comprise a second sleeper cover part. The second sleeper cover part may be configured to extend from one edge of the second cover part, in a direction perpendicular to a plane in which the second cover part extends, so that, when positioned adjacent to a rail and against a sleeper, is arranged to cover at least part of the sleeper.

When viewed along the length axis of the sleeper, the rail cover as described defines an "L" shape. Cables may preferably be positioned to extend under the rail, alongside the sleeper. In this case, in accordance with an embodiment, a sleeper cover may be provided, to be positioned between the cable and the sleeper, so as to provide mutual protection from wear to the cable and the sleeper. The sleeper cover may include first and second parts and may extend along a surface of the sleeper.

Optionally, the first and second sleeper cover parts may be connectable by another adjustable ratcheting connection, such that, when connected and pressed together, both ratcheting connections are engaged.

In accordance with this example, the first cover part is connected to or integral with the first sleeper cover part and the second cover part is connected to or integral with the second sleeper cover part. Advantageously, both the first and second cover parts, and the first and second sleeper cover parts, may be connected by a ratcheting connection.

This provides additional stability of the cover and further inhibits the parts from separating, meaning the rail cover is held securely in place.

According to an example, at least one of the first and second connecting portions may be made of a resiliently deformable material.

In order to allow the mutually connectable cover parts to be connected, the connecting portions may include resiliently deformable material such that the connecting portion including the resiliently deformable material flexes enough for the cover parts to be connected.

Optionally, the first and second cover parts are made of different materials, respectively. It may be preferable for one of the first and second cover part to be made of a rigid material and the other to be deformable/flexible, to aid connection of the two cover parts.

Further, according to an embodiment, at least one of the first and second side portions are made of a rigid material. The portions of the rail cover that extend over the sides of the foot of the rail may be rigid as these allow the rail cover to grip or hold the rail, when in use.

According to an embodiment of another aspect there is provided a rail cover for covering an underside of a foot of a railway rail, the rail cover comprising: mutually connectable cover parts configured to respectively extend at least partially around opposing sides of the foot of the railway rail and connectable by an interference fit to resist separation of the mutually connectable cover parts. An interference fit may be provided by machining of opposing surfaces of the cover parts or material for example, to produce a resistance to separation, which may be provided by a predetermined amount of friction between the surfaces.

Optionally, the interference fit is provided by opposing racks of teeth configured to interdigitate to resist separation of the mutually connectable cover parts. Interdigitating teeth provide a secure resistance against separation of the cover parts.

Other advantages associated with embodiments described above include rapid and low cost installation, low cost of the adjustable rail cover and no need for tools to install the cover.

BRIEF DESCRIPTION OF THE DRAWINGS

The invention will hereinafter be described, by way of example only, with reference to the attached drawings, in which.

Throughout this description any features which are similar to features in other figures have been given the same reference numerals.

DETAILED DESCRIPTION

The description below sets forth example rail covers according to this disclosure. Further examples and implementations will be apparent to those having ordinary skill in the art. Further, those having ordinary skill in the art will recognize that various equivalent techniques may be applied in lieu of, or in conjunction with, the examples discussed below, and all such equivalents should be deemed as being encompassed by the present disclosure.

The arrangements described herein can be implemented in a wide range of devices and systems. However, for ease of explanation, an illustrative example will be described.

According to one or more embodiments of the invention, there is provided a rail cover capable of providing protection from wear to cables which are to be run from one side of one or more railway rails (rails), underneath the rails, to the other side.

Figure 1A:
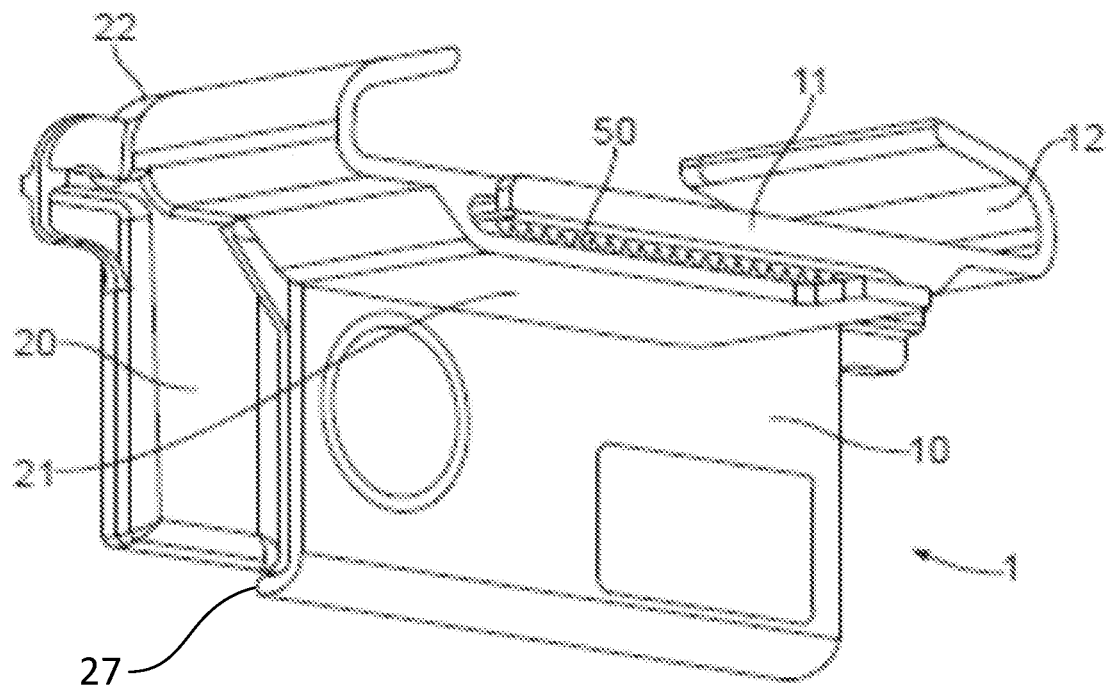
FIGS. 1a, 1b and 1c show perspective views of an exemplary embodiment of a rail cover.

FIG. 1a shows an example of an embodiment of a rail cover 1. As shown, the rail cover 1 is suitable for covering an underside of a foot 110 of a railway rail 100. The rail cover 1 comprises mutually connectable cover parts 10, 20 which are configured to respectively extend at least partially around opposing sides of the foot of the railway rail. The mutually connectable cover parts 10, 20 are connectable by an adjustable ratcheting connection 50 to resist separation of the mutually connectable cover parts 10, 20.

In accordance with an embodiment, a rail cover 1 is attachable to a railway rail 100 and, more specifically to the foot 110 of a railway rail 100. A railway rail 100, when viewed in cross-section, conventionally has a shape including wider sections at the top and bottom and a narrower middle section. These sections are known as the foot (bottom) 110, web (middle) 120 and head (top) 130. In railway infrastructure, cables sometimes need to be routed underneath the rail(s). In order to inhibit the effects of wear on such cables due to relative movement of the cable and rail, a rail cover in accordance with the described embodiments may be implemented.

The rail cover 1, in use, is attached to the foot 110 of the rail 100, so as to cover the underside. FIG. 1a shows an exemplary embodiment of a rail cover 1. As shown in FIG. 1a, the rail cover 1 includes two parts; a first cover part 10 and a second cover part 20. The two parts 10, 20 are configured to be connectable to each other. The two parts 10, 20 may be connected together by various types of connections, including for example a ratcheting connection, opposing racks of interdigitating teeth and/or opposing surfaces, for example, which when connected produce an interference fit, as shown in FIG. 1a.

Figure 1B:
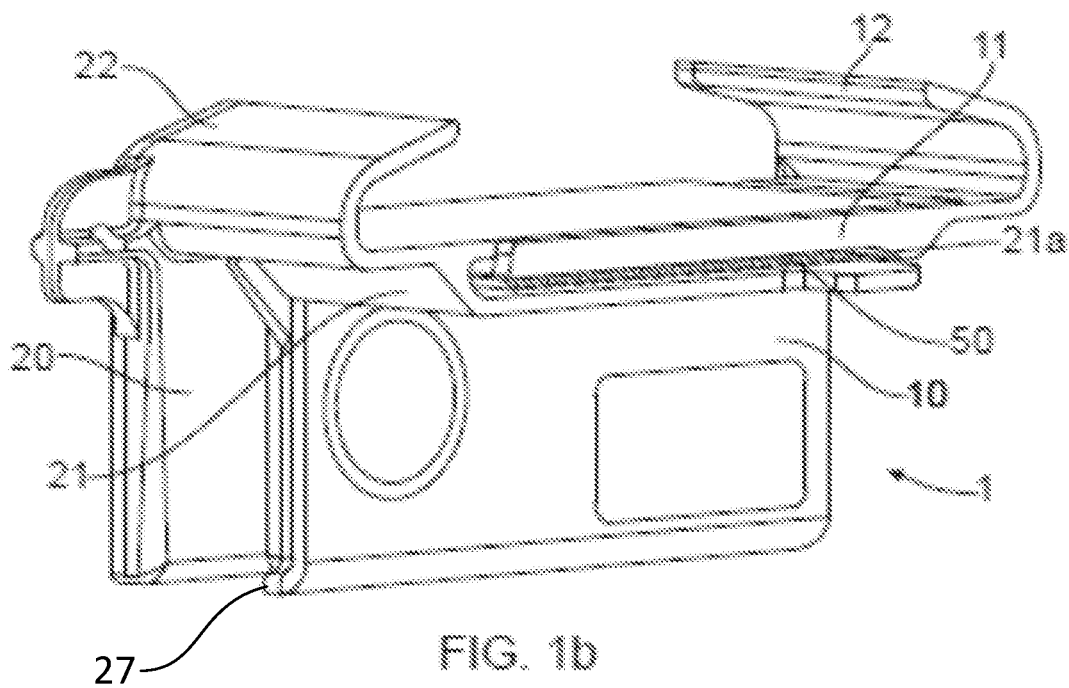
Figure 1C:
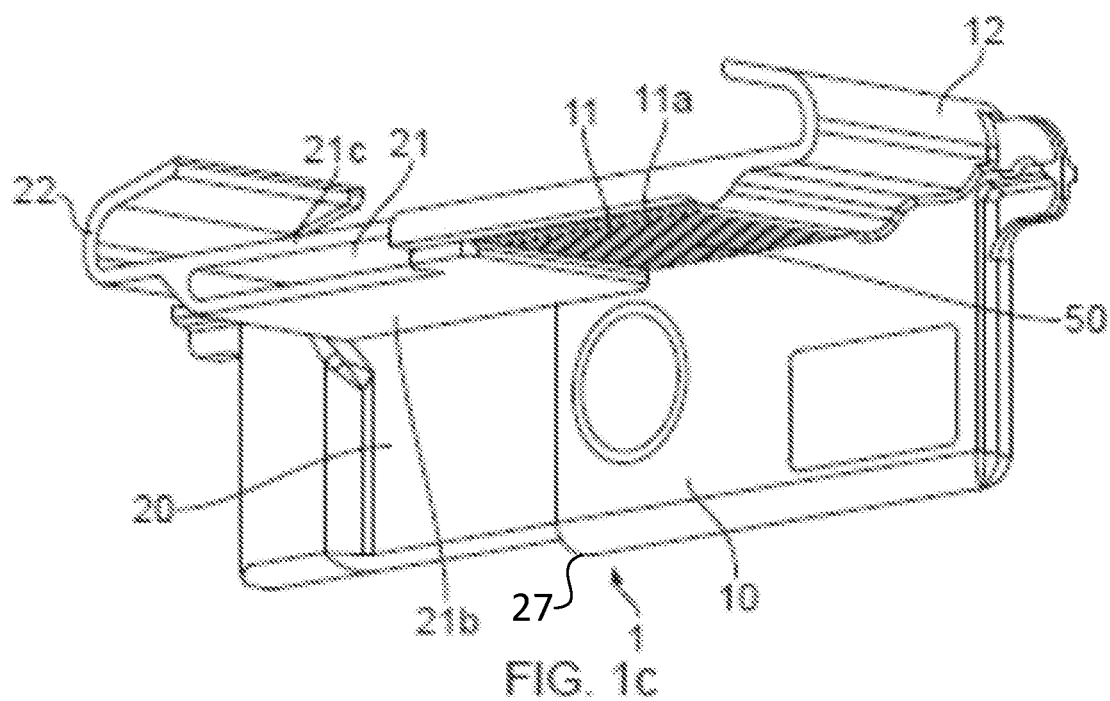

In the ratcheting connection, in accordance with the example, at least one of the mutually connectable parts 10, 20 comprises teeth in the form of a linear rack and an opposing mutually connectable part comprises a protrusion, for example a pawl, configured to allow the connectable parts to be pressed together, but to resist the connectable parts being separated. The protrusion may be elastically deformable or may be spring-loaded to encourage engagement with the opposing teeth of the linear rack. When in use, the teeth of the linear rack are positioned to engage with the protrusion when the connectable parts are connected. When the connectable parts are pressed together, the teeth are pressed against the side of, and pass over, the protrusion, such that, when connected, the protrusion is positioning between two of the teeth thus preventing the connectable parts from being pulled apart/separated. FIGS. 1b and 1c show alternative views of the rail cover 1 shown in FIG. 1a.

Figure 2:
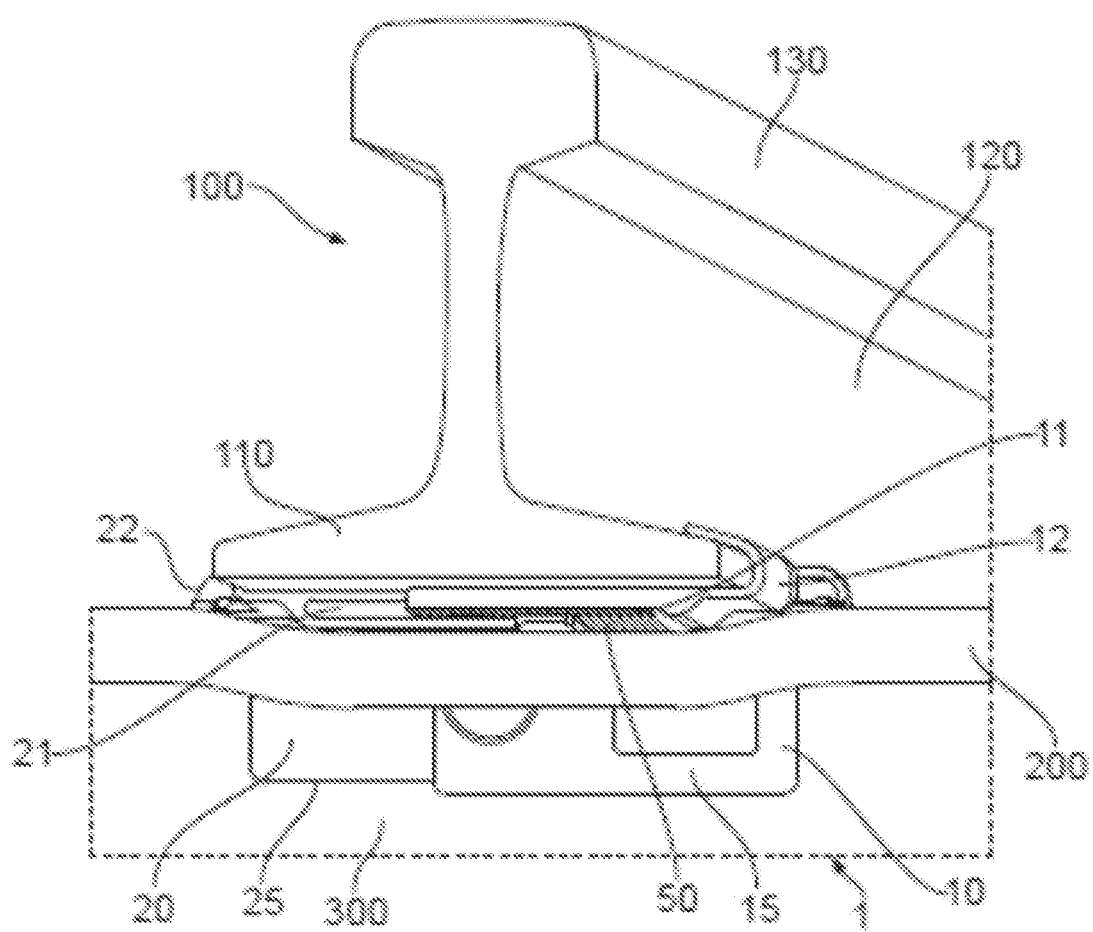
FIG. 2 shows an exemplary embodiment of a rail cover attached to a rail.

FIG. 2 shows an exemplary embodiment of a rail cover 1 attached to the foot 110 of a rail 100. As shown, the mutually connectable cover parts 10, 20 include a first cover part 10 including a first connecting portion 11 and a first side portion 12 and a second cover part 20 including a second connecting portion 21 and a second side portion 22. The first and second connecting portions 11, 21 are arranged to connect together by the adjustable ratcheting connection 50 which is adjustable to adjust the positions of the first and second cover parts 10, 20 relative to each other. The first and second side portions 12, 22 are configured to extend at least partially around opposite sides of the foot 110 of the rail 100 so that, when the first and second connecting portions 11, 21 are connected and pressed together, the first and second side portions 12, 22 hold the rail cover 1 against the foot 110 of the rail 100.

The first connecting portion 11 may comprise a flat elongate member. According to an embodiment, as shown for example in FIG. 1c, the first connecting portion 11 defines, on one side, teeth in the form of a linear rack 11a. The second connecting portion 21 defines a protrusion 21a, which can be seen in FIG. 1b, which may resemble one tooth, similar to those of the first connecting portion 11. The second connecting portion 21 further defines an arm 21b and support 21c, wherein the arm 21b includes the protrusion 21a, positioned so as to oppose and interdigitate with the teeth of the linear rack 11a and extends substantially in parallel with the first connecting portion 11. The support 21c extends, on the opposite side of the first connecting portion 11, substantially in parallel with the first connecting portion 11 also, such that the first connecting portion 11, when the mutually connectable cover parts 10, 20 are connected, is held between the arm 21b and the support 21c.

The support 21c may for example be made of a relatively rigid/inflexible material and the arm 21b may for example be made of an elastically/resiliently deformable material, so as to allow some flex when the protrusion 21a passes over the linear rack 11a.

Alternatively, the teeth of the linear rack 11a or the protrusion 21a may be made of an elastically/resiliently deformable material, so as to allow some flex when the protrusion 21a passes over the linear rack 11a.

In a further exemplary embodiment, the first connecting portion 11 defines teeth in the form of a linear rack 11a, as described above. The second connecting portion 21 defines opposing teeth in the form of another linear rack. Therefore, where in the above described embodiment, a single protrusion 21a opposed and interdigitated with the teeth of the linear rack 11a, in this embodiment opposing racks of teeth pass over each other, as the mutually connectable cover parts 10, 20 are connected and the teeth, when connected, interdigitate.

In a further exemplary embodiment, the first connecting portion 11, which comprises a flat elongated member, defines a surface on at least one side, which may be a flat surface or configured to produce a desired level of friction when in contact with an opposing surface of the second connecting portion 21. The second connecting portion 21 comprises an arm defining a surface, which is arranged to oppose the surface of the flat elongated member of the first connecting portion 11, and, when the mutually connectable cover parts 10, 20 are connected, contacts the opposing surface so as to provide an interference fit, which resists the mutually connectable cover parts 10, 20 being separated.

According to a further example the rail cover 1 may further comprise a first sleeper cover part 15 configured to extend from one edge of the first cover part 10, in a direction perpendicular to a plane in which the first cover part 10 extends, and may be positioned adjacent to a rail 100 and against a sleeper 300, so as to cover at least part of the sleeper 300. The rail cover 1 may further comprise a second sleeper cover part 25 configured to extend from one edge of the second cover part 20, in a direction perpendicular to a plane in which the second cover part 20 extends, and may be positioned adjacent to a rail 100 and against a sleeper 300, so as to cover at least part of the sleeper 300.

FIG. 2 further shows an example of a rail cover 1 including first and second sleeper cover parts 15, 25 positioned next to a sleeper 300, wherein the first sleeper cover part 15 includes a cover flange 27 extending towards the sleeper 300 in a direction perpendicular to the extension of the second sleeper cover part 25. As shown, the first and second cover parts 10, 20 extend along the underside of the foot 110 of the rail 100 and over the sides of the foot 110 to hold the rail cover 1 in place. The first and second sleeper cover parts 15, 25 extend along the side surface of the sleeper 300. With this arrangement, the cable 200, which extends next to the sleeper 300 and under the rail 100, is offered protection by the rail cover 1 from wear caused by relative movement of the rail 100, sleeper 300 and cable 200.

In use, the rail cover 1 may be moved between an open position, wherein the connecting parts 10, 20 are sufficiently separated to allow the rail cover 1 to be attached to the foot 110 of the rail 100. The connectable parts 10, 20 are then moveable to a closed position, by application of force towards the respective opposing connectable part, wherein the connectable parts 10, 20 move until, at least at a point, sitting flush against either side of the foot 110 of the rail 100. The opposing connectable parts 10, 20, produce an interference fit to resist further movement to hold the rail cover 1, in this closed position.

In an embodiment, the rail cover 1 may be positioned to attach to the underside of the foot 110 of the rail 100 adjacent to a railway sleeper 300, which is supporting the rail 100, such that the connecting parts 10, 20 extend along the underside of the rail 100 and the sleeper cover parts 15, 25 extend alongside the sleeper 300. Positioning the rail cover 1 adjacent to a sleeper 300 provides the added benefit that cables 200 extending under the rail 100 will have extra protection from damage.

The rail cover 1 is preferably made of one or more non-conductive materials, preferably with a high durability. For example nylon 66 may be used for the rail cover 1, or at least one of the mutually connectable cover parts 10, 20.

According to the above examples, it is possible to reduce wear of cables directed under the rail, for example by positioning the rail cover 1 between the cable 200 and the rail 100.

It will be appreciated that features of any of the above aspects and examples may be provided in any combination with the features of any other of the above aspects and examples. It should be noted that the above-mentioned examples illustrate rather than limit the disclosure, and that those skilled in the art will be able to design many alternative configurations without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. The features of any dependent claim may be combined with the features of any of the independent claims or other dependent claims.

The invention claimed is:

1. A rail cover for covering an underside of a foot of a railway rail, the rail cover comprising:
   mutually connectable cover parts configured to respectively extend at least partially around opposing sides of the foot of the railway rail and connectable by an adjustable ratcheting connection to resist separation of the mutually connectable cover parts;
   a first protective sleeper cover part configured to extend from one edge of a first cover part, in a direction perpendicular to a plane in which the first cover part extends, so that, when positioned adjacent to a rail and against a sleeper, covers at least part of the sleeper;
   a second protective sleeper cover part configured to extend from one edge of a second cover part, in a direction perpendicular to a plane in which the second cover part extends, so that, when positioned adjacent to a rail and against a sleeper, is arranged to cover at least part of the sleeper, wherein
   a sleeper cover, comprising the first protective sleeper cover part and the second protective sleeper cover part, extends along a surface of the sleeper for a width of the foot of the railway rail; and wherein the first protective sleeper cover part includes a cover flange extending towards the sleeper in a direction perpendicular to the extension of the second protective sleeper cover part.

2. The rail cover according to claim 1, wherein the mutually connectable cover parts include:

a first cover part including a first connecting portion and a first side portion; and a second cover part including a second connecting portion and a second side portion;

the first and second connecting portions being configured to connect together by the adjustable ratcheting connection which is adjustable to adjust the relative positions of the first and second cover parts, and the first and second side portions being configured to extend at least partially around opposite sides of the foot of the rail so that, when the first and second connecting portions are connected and pressed together, the first and second side portions hold the adjustable rail cover against the foot of the rail.

3. The rail cover according to claim 1, wherein the ratcheting connection is a rack and pawl-type mechanism.

4. The rail cover according to claim 1, wherein the first and second cover parts are electrically non-conductive.

5. The rail cover according to claim 1, wherein at least one of the first and second connecting portions are made of a resiliently deformable material.

6. The rail cover according to claim 1, wherein the first and second cover parts are made of different materials, respectively.

7. The rail cover according to claim 1, wherein at least one of the first and second side portions are made of a rigid material.

8. A rail cover for covering an underside of a foot of a railway rail, the rail cover comprising:

mutually connectable cover parts configured to respectively extend at least partially around opposing sides of the foot of the railway rail and connectable by an interference fit to resist separation of the mutually connectable cover parts;

a first protective sleeper cover part configured to extend from one edge of a first cover part, in a direction perpendicular to a plane in which the first cover part extends, so that, when positioned adjacent to a rail and against a sleeper, covers at least part of the sleeper; and a second protective sleeper cover part configured to extend from one edge of a second cover part, in a direction perpendicular to a plane in which the second cover part extends, so that, when positioned adjacent to a rail and against a sleeper, is arranged to cover at least part of the sleeper, wherein a sleeper cover, comprising the first protective sleeper cover part and the second protective sleeper cover part, extends along a surface of the sleeper for a width of the foot of the railway rail, and wherein the first protective sleeper cover part includes a cover flange extending towards the sleeper in a direction perpendicular to the extension of the second protective sleeper cover part.

9. The rail cover according to claim 8, wherein the interference fit is provided by opposing racks of teeth configured to interdigitate to resist separation of the mutually connectable cover parts.

* * * * *